United States Patent
Flynn et al.

(10) Patent No.: US 8,218,458 B2
(45) Date of Patent: Jul. 10, 2012

(54) METHOD AND APPARATUS FOR VOICE CONFERENCE MONITORING

(75) Inventors: Peter Flynn, Boyds, MD (US); Choon Shim, Ijamsville, MD (US); Liehua Xie, Herndon, VA (US)

(73) Assignee: Cisco Systems, Inc., San Jose, CA (US)

( * ) Notice: Subject to any disclaimer, the term of this patent is extended or adjusted under 35 U.S.C. 154(b) by 925 days.

(21) Appl. No.: 11/565,181

(22) Filed: Nov. 30, 2006

(65) Prior Publication Data

US 2008/0219177 A1    Sep. 11, 2008

(51) Int. Cl.
 H04M 1/24 (2006.01)
 H04M 3/42 (2006.01)
(52) U.S. Cl. .............. 370/260; 379/93.21; 455/416
(58) Field of Classification Search .......... 370/259–271, 370/252, 253; 379/201.01–218.02, 93.21, 379/158, 202.01, 205.01; 455/403, 416, 455/414.1, 415; 709/204–207, 223, 224; 348/14.01, 14.08, 14.09, 14.1; 715/753, 715/756

See application file for complete search history.

(56) References Cited

U.S. PATENT DOCUMENTS

| | | | |
|---|---|---|---|
| 6,359,976 B1* | 3/2002 | Kalyanpur et al. | 379/134 |
| 6,418,125 B1* | 7/2002 | Oran | |
| 6,510,219 B1* | 1/2003 | Wellard et al. | 379/221.01 |
| 6,657,957 B1* | 12/2003 | Cheung et al. | 370/230 |
| 6,671,262 B1* | 12/2003 | Kung et al. | |
| 6,798,745 B1* | 9/2004 | Feinberg | 370/235 |
| 6,814,842 B1* | 11/2004 | Yago et al. | 704/270.1 |
| 6,850,496 B1* | 2/2005 | Knappe et al. | |
| 7,283,619 B2* | 10/2007 | Ethier et al. | 379/32.05 |
| 7,480,500 B1* | 1/2009 | Mittal | 455/403 |
| 2002/0105909 A1* | 8/2002 | Flanagan et al. | 370/230 |
| 2003/0063573 A1* | 4/2003 | Vandermersch | |
| 2003/0093513 A1* | 5/2003 | Hicks et al. | 709/224 |
| 2003/0142201 A1* | 7/2003 | Babka et al. | 348/14.09 |
| 2004/0076277 A1* | 4/2004 | Kuusinen et al. | |
| 2004/0150712 A1* | 8/2004 | Le Pennec | 348/14.01 |
| 2004/0165570 A1* | 8/2004 | Lee | 370/349 |
| 2005/0094580 A1* | 5/2005 | Kumar et al. | |
| 2005/0141690 A1* | 6/2005 | Wengrovitz | 379/207.02 |
| 2005/0157660 A1* | 7/2005 | Mandato et al. | |
| 2005/0180341 A1* | 8/2005 | Nelson et al. | |
| 2005/0201303 A1* | 9/2005 | Oliveira et al. | |
| 2005/0232238 A1* | 10/2005 | Oran | 370/352 |
| 2006/0146806 A1* | 7/2006 | Khuc et al. | |
| 2007/0019618 A1* | 1/2007 | Shaffer et al. | |
| 2007/0133435 A1* | 6/2007 | Eneroth et al. | |
| 2007/0201473 A1* | 8/2007 | Bhatia et al. | 370/392 |
| 2008/0043644 A1* | 2/2008 | Barkley et al. | |
| 2008/0063173 A1* | 3/2008 | Sarkar et al. | 379/202.01 |

* cited by examiner

*Primary Examiner* — Chi Pham
*Assistant Examiner* — Prince A Mensah
(74) *Attorney, Agent, or Firm* — Schwegman, Lundberg & Woessner, P.A.

(57) ABSTRACT

This method and apparatus is used to process call control protocol messages and quality of service media streams from an internet protocol conferencing session. The status and attributes processed from call control protocol messages are combined with the quality of service information for the parties connecting to a conferencing session for display to users in real-time.

17 Claims, 6 Drawing Sheets

METHOD AND APPARATUS FOR VOICE CONFERENCE MONITORING

FIELD OF INVENTION

The present invention relates to a method and apparatus that can be used to process the status, attributes, and quality of service of an internet protocol conferencing session by processing call control protocol messages and quality of service associated with media streams.

BACKGROUND

Internet protocol multipoint conferencing systems offer a variety of user features, but not all conferencing systems are capable of displaying the real-time status, attributes, and corresponding quality of service of one or more connections in a conference. The attributes include information such as the internet protocol (IP) addresses or identities of the parties in the call. The status of a conference includes status information such as whether or not a party has joined or left the conference and the times for these events. Quality of service information includes quality information such as the jitter, loss, and delay of each of the connecting parties in the conference. Monitoring can be accomplished using several known approaches including:

Call data record retrieval—Some conferencing units store detailed information about calls in call data logs, but the information is not available and cannot be compiled until after a conference call is completed. In these systems, the advantages of real-time conference status monitoring is not available.

Real-time Transport Protocol (RTP) sniffing—RTP is a protocol commonly used by IP multipoint conferencing systems and contains information about quality of service, but the RTP stream does not contain the signature information necessary to identify it with a particular connection of a conferencing party.

Real-time Transport Control Protocol (RTCP) monitoring and display—RTCP packets contain session description and information on a media stream that can be used to monitor the real-time caller information and quality of voice conversation in a conference, however, not all multipoint conferencing systems support RTCP.

Common to all of these systems, despite differing hardware configurations and conferencing features, is a control protocol for engaging and disengaging calls and an internet protocol for transporting a media stream, typically RTP.

Although some options for monitoring the status, attributes, and quality of service of conference calls are available, a need exists for real-time monitoring supported by a variety of conferencing systems.

SUMMARY

A method and apparatus can enhance the features of an internet protocol conference calling session, by allowing conference call users to monitor, in real-time, the status, attributes, and quality of service for one or more parties connecting in a multipoint conference calling session. The method and apparatus process information from selected call control protocols already in use by a multipoint control unit within a conference calling system to collect the status and attributes of each conferencing party. The status and attributes of the conferencing parties are then associated with selected quality of service parameters contained with an IP media stream associated with a conference calling session.

DETAILED DESCRIPTION

A method and apparatus can enhance the features of an internet protocol conference calling session, by allowing conference call users to monitor, in real-time, the status, attributes, and quality of service for one or more parties connecting in a multipoint conference calling session. The method and apparatus process information from selected call control protocols already in use by a multipoint control unit within a conference calling system to collect the status and attributes of each conferencing party. The attributes include information such as the internet protocol (IP) addresses or identities of the parties in the call and the status of a conference includes status information such as whether or not a party has joined or left the conference and the times for these events. The status and attributes of the conferencing parties are then associated with selected quality of service parameters included in and/or calculated based on an IP media stream (e.g., RTP) that is utilized in a conference calling session. More details regarding calculating quality of service metrics based on an IP media stream are set forth in co-pending application Ser. No. 11/555,484, "Method and Apparatus for High Resolution Passive Network Latency Measurement," which is incorporated herein by reference. Quality of service information (also can be referred to as quality of service parameters) includes quality information such as the jitter, loss, and delay of each of the connecting parties in the conference. By displaying the results, a user can monitor, in real-time (e.g., substantially the same time as a call is occurring), the status, attributes, and quality of service of one or more conferencing parties connected to the conference calling session.

Figure 1:
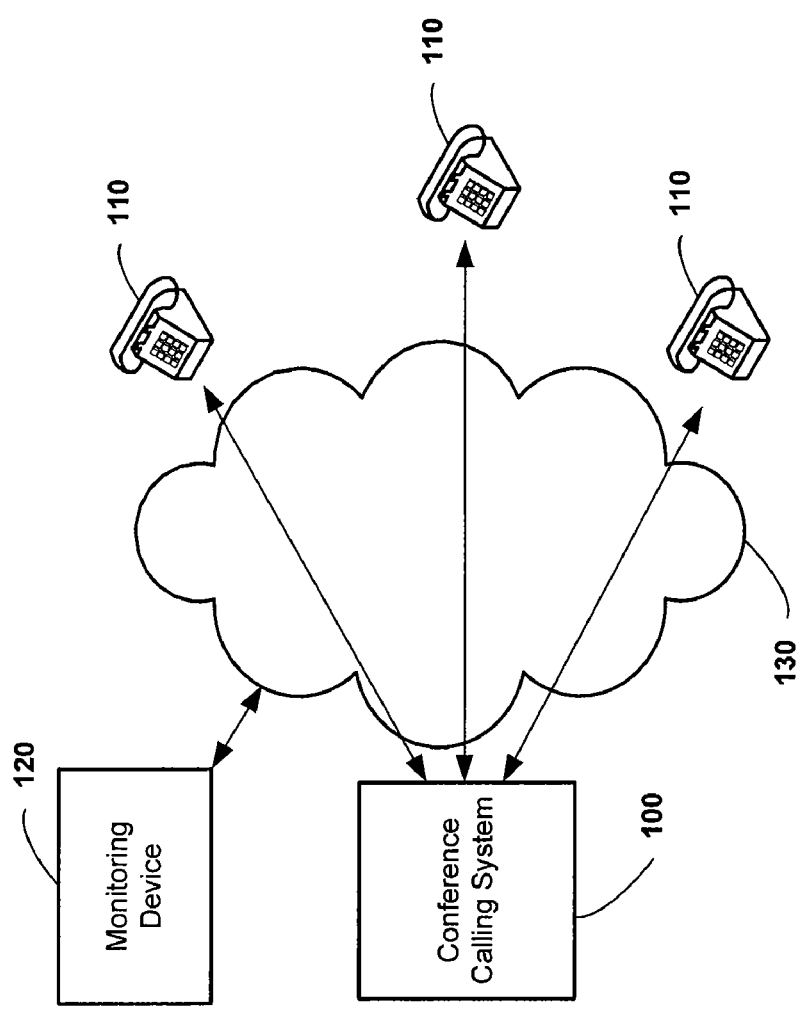
FIG. 1 illustrates a schematic diagram of an embodiment of the invention implemented in a centralized conference calling configuration.
Figure 2:
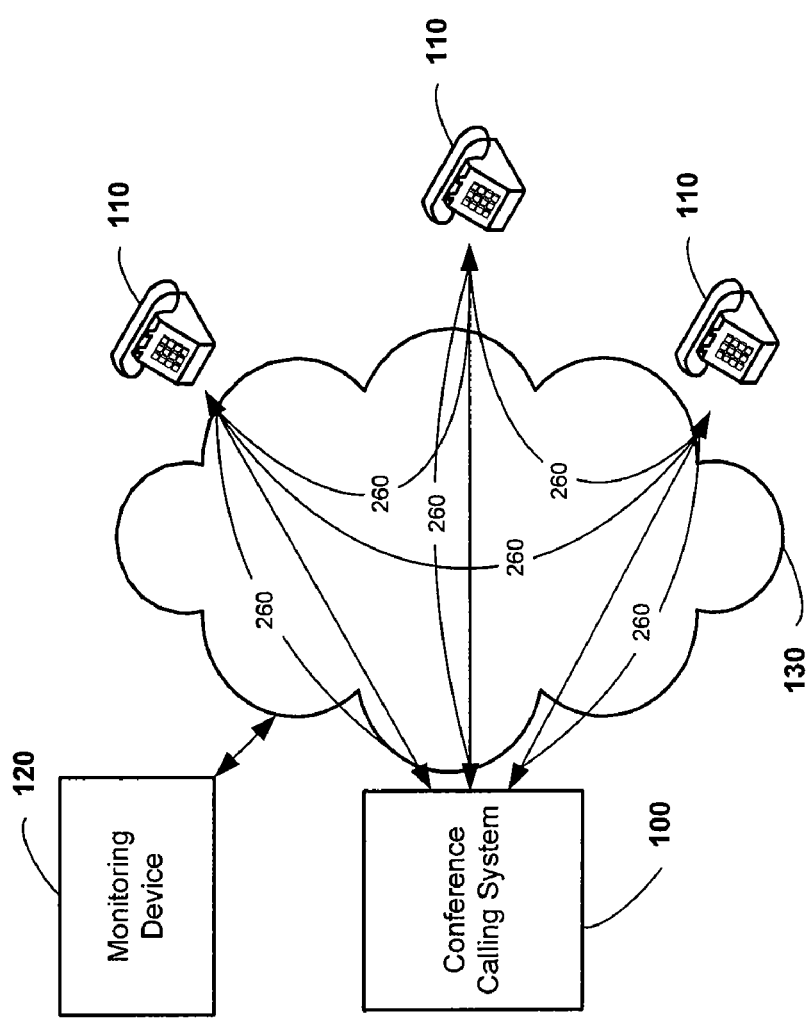
FIG. 2 illustrates a schematic diagram of an embodiment of the invention implemented in a decentralized conference calling configuration.
Figure 3:
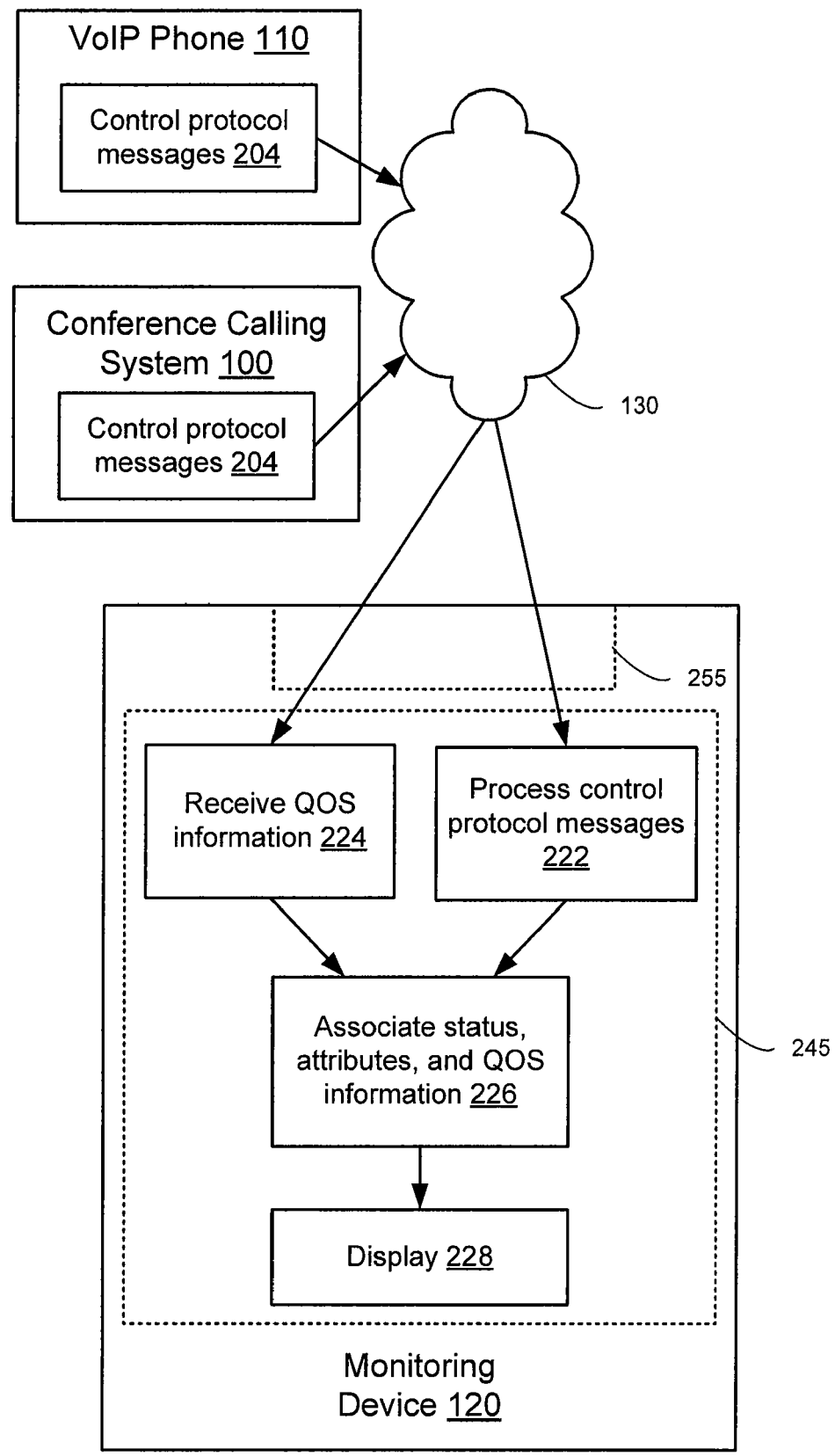
FIG. 3 is a flowchart of the processing of control protocol and quality of service information between devices in an embodiment of the invention.

FIGS. 1 and 2 are diagrams that illustrate real-time voice conference monitoring of centralized and decentralized multipoint conferencing systems, respectively, through a monitoring device. FIG. 3 shows the processing of information by the monitoring device to accomplish real-time voice conference monitoring in the embodiments in FIGS. 1-2.

Centralized multipoint conferences require the existence of a multipoint control unit to facilitate a multipoint conference. A typical multipoint control unit that supports centralized multipoint conferences consists of a multipoint controller and an audio, video, and/or data multipoint processor. All terminals send audio, video, data, and control streams to the multipoint controller in a point-to-point fashion. The multipoint controller centrally manages the conference using its control functions that also define the capabilities for each terminal. The multipoint processor performs audio mixing, data distribution, and video switching/mixing functions typically performed in multipoint conferences and sends the resulting streams back to the participating terminals. The multipoint processor may also provide conversion between different codecs and bit rates and may use multicast to distribute processed video.

Decentralized multipoint conferences make use of multicast technology. The multipoint control unit in a decentralized multipoint conference still centrally manages the conference using its control functions that define the capabilities for each terminal, but the participating terminals multicast audio and video to other participating terminals as well as the multipoint control unit. The multipoint control unit receives the multicasted audio and video, but the multipoint control unit is not configured to distribute the audio and/or video to each of the terminals.

Within each of the centralized and decentralized hardware configurations, users can engage in multipoint conference calls in a variety of methods depending on the capability of the conferencing system. For example, conferences may be set up in an ad-hoc fashion by a single user who adds parties individually and can restrict the conference to only the individuals that have been specifically added. Other conference calls may be set up by having individual callers dial into a conference bridge at a specified time using a call-in number.

FIG. 1 shows a multipoint control unit or conference calling system 100 configured for centralized multipoint conferencing, according to an embodiment of the invention. A monitoring device 120 in this embodiment is configured to monitor signals exchanged between the multipoint control unit 100 and multiple VoIP phones 110 over a network 130. The VoIP 110 phones are communicating over a single network 130, but the VoIP phones 110 could be communicating via separate networks including wired or wireless networks. As in a typical centralized multipoint conferencing session, the multipoint control unit 100 receives and distributes control protocol message exchanges and communication (e.g., via RTP packets) between the VoIP phones 110 once a conferencing session is established. The multipoint control unit 100 exchanges the control protocol message with the VoIP phones 110 to set up and terminate connections for the conferencing parties. The communication between parties in a VoIP conference call typically occur via an RTP media stream.

The monitoring device 120 can be configured to receive (e.g., via the network 130, via switched port analyzer (SPAN) port, etc.) and process control protocol messages sent (e.g., exchanged) between the multipoint control unit 100 and the VoIP phones 110 over the network 130. The monitoring device 120 uses the control protocol messages to extract attribute and status information included within the control protocol messages. The monitoring device 120 is also configured to receive and/or calculate quality of service information based on, for example, RTP packets exchanged between the multipoint control unit 100 and the VoIP phones. In this embodiment, the monitoring device is configured to capture the RTP packets from the network 130. The monitoring device 120 is also configured to display the status, attributes, and quality of service in real-time to a user (not shown). In some embodiments, the capturing, receiving, processing and/or displaying can be triggered by or in response to a change in state of a multipoint conferencing session.

FIG. 2 is a diagram that illustrates real-time voice conference monitoring through a monitoring device 120 connected via a network 130 to a decentralized multipoint control unit 100. Like the centralized multipoint conferencing configuration, the decentralized multipoint conference includes a multipoint control unit or conference calling system 100 and multiple VoIP phones 110 connected with the multipoint control unit 100 over a network 130. In a decentralized multipoint conferencing session, as in a centralized multipoint conferencing session, the multipoint control unit 100 exchanges control protocol messages with the VoIP phones 110 to set up and terminate connections, however, communication between parties, once a conferencing session is established, is multicast 260 over the network 130 to all of the conferencing parties. The communication (e.g., media communication via RTP packets) between connecting parties is not distributed to each party from the multipoint control unit 100.

The monitoring device 120, like in the centralized multipoint conferencing configuration, is capable of processing control protocol messages sent between the multipoint control unit 100 by retrieving the control protocol messages from the network 130. The monitoring device 120 is also configured to monitor, via the network 130, media communication (e.g., via RTP packets) between the VoIP phones 110. The monitoring device 120 can calculate quality of service information based on the media communication streams. If the media communication between the VoIP phones 110 includes quality of service information (e.g., included in RTCP packets), the monitoring device 120 can be configured to extract that information.

In some embodiments, the VoIP phones 110 described in the embodiments in FIGS. 1 and 2 above can be any type of audio, video, or other multimedia communication device or terminal that is capable of interfacing with a multipoint control unit 100 to aid a party in engaging in a multipoint conferencing session. Also, the number of communication devices or terminals engaging in a centralized or decentralized multipoint conferencing session can vary depending upon the capability of the multipoint control unit 100.

FIG. 3 is a flowchart that shows the flow and processing of information through the components in FIGS. 1 and 2 to display the status, attributes, and quality of service of the connections to multipoint conference calling users in real-time. The processing of information within this flowchart applies to both the centralized and decentralized multipoint conferencing configurations and the modes of conferencing employed by these configurations such as ad-hoc conferencing or bridge conferencing. Despite the difference in communication between connecting parties in the conferencing configurations, the information necessary for real-time voice conference monitoring is accessible by the monitoring device 120 from the network 130 in each of the configurations.

As shown in FIG. 3, control protocol messages 204 are sent by the multipoint control unit 100 and VoIP phone 110 are accessed by the monitoring device 120 via the network 130. The monitoring device 120 is also configured to receive quality of service information 224. The quality of service information can be received from a separate device (not shown) that has retrieved the quality of service information and sent it to the monitoring device 120. In some embodiments, the monitoring device can monitor RTP packets exchanged over the network 130 (e.g., communication between the VoIP phone 110 and/or conference calling system 100) and calculate quality of service metrics from information included in the RTP packets. Monitoring can be implemented in any conferencing system where the monitoring device 120 can access the control protocol message 204 and receive/calculate quality of service information. This flowchart shows that this information is retrieved by the monitoring device 120 for processing 222, 224, and 226 and then output for display 228.

The details of the processing steps 222, 224, and 226 are discussed below. The control protocol messages and QOS information can be received via an input 255 and the processing (e.g., associating, calculating) performed by the monitoring device 120 can be performed on a processor 245 (e.g., central processing unit).

The flowchart shows that the monitoring device 120 is configured/programmed to receive quality of service information 224. Because not all quality of service information may be desirable for real-time display, the monitoring device 120 is programmed to select and/or calculate only the quality of service information selected for display. For example, the quality of service can be different for a particular connection depending on the path by which the connection is established, so a user, may be interested in only the quality of service for connections with a low quality of service. The monitoring device can be configured/programmed to display the quality of service for a connection if its delay exceeds a defined threshold value. A different user may be interested in the quality of service of a particular connection regardless of the quality of the connection.

In addition, a user may not be interested in all of the specific quality of service measurements that are available for a particular connection such as, for example, the percentage of out of order packets exchanged over the IP connection. Although this metric may be retrieved and/or calculated by the monitoring device 120 from a typical VoIP phone conferencing RTP media stream, a user may be interested in only the delay and jitter of a particular connection. The monitoring device 120 can be programmed to retrieve and/or calculate only the delay and jitter information for a particular connection. The monitoring device 120 can be programmed to process the selected quality of service information for a particular connection in a multiplicity of combinations with different criteria. The selecting can be accomplished based on a policy implemented in the monitoring device 120 as, for example, a set of threshold conditions and/or a reference table.

The flowchart shows that the monitoring device 120 is programmed to retrieve and then process the control protocol messages 222 sent over the network 130 by the VoIP phones 110 and/or the multipoint control unit 100. During the course of a multipoint conference calling session, a multiplicity of termination and setup control protocol messages 204 are exchanged and the order and types of the control protocol messages 204 can vary with the number of VoIP phones 110 and the inputs from users of the VoIP phones 110. Each of the control protocol messages 204 further contains a variety of status and attribute information about each of the VoIP phones 110 as well as the multipoint conference calling session itself. Because not all of the control protocol messages 204 sent over the network 130 by the VoIP phones 110 and/or the multipoint control unit 100 contain status and attribute information that may be selected for display to a particular user, the monitoring device 120 is configured to process the control protocol messages 222 to extract the selected status and attribute information. A detailed example of the processing of a specific control protocol message exchange is described in FIGS. 4-6.

After the monitoring device has received (e.g., calculated) the quality of service information 224 and processed the control protocol messages 222 to extract the selected status, attributes, and quality of service information, the monitoring device 120 associates the status and attribute information with the selected quality of service information 226. This combined information can be further processed and/or formatted if necessary so that the status, attributes, and quality of service information can be displayed in real-time on the display 228. The display 228 in this figure is integrated into the monitoring device 120, but the display 228 can be a single display or multiple displays distributed to users as stand alone displays or integrated into other components such as the multipoint control unit 100 or the VoIP phones 110. In some embodiments, the display 228 can be a display in a centralized management unit (not shown).

Figure 4:
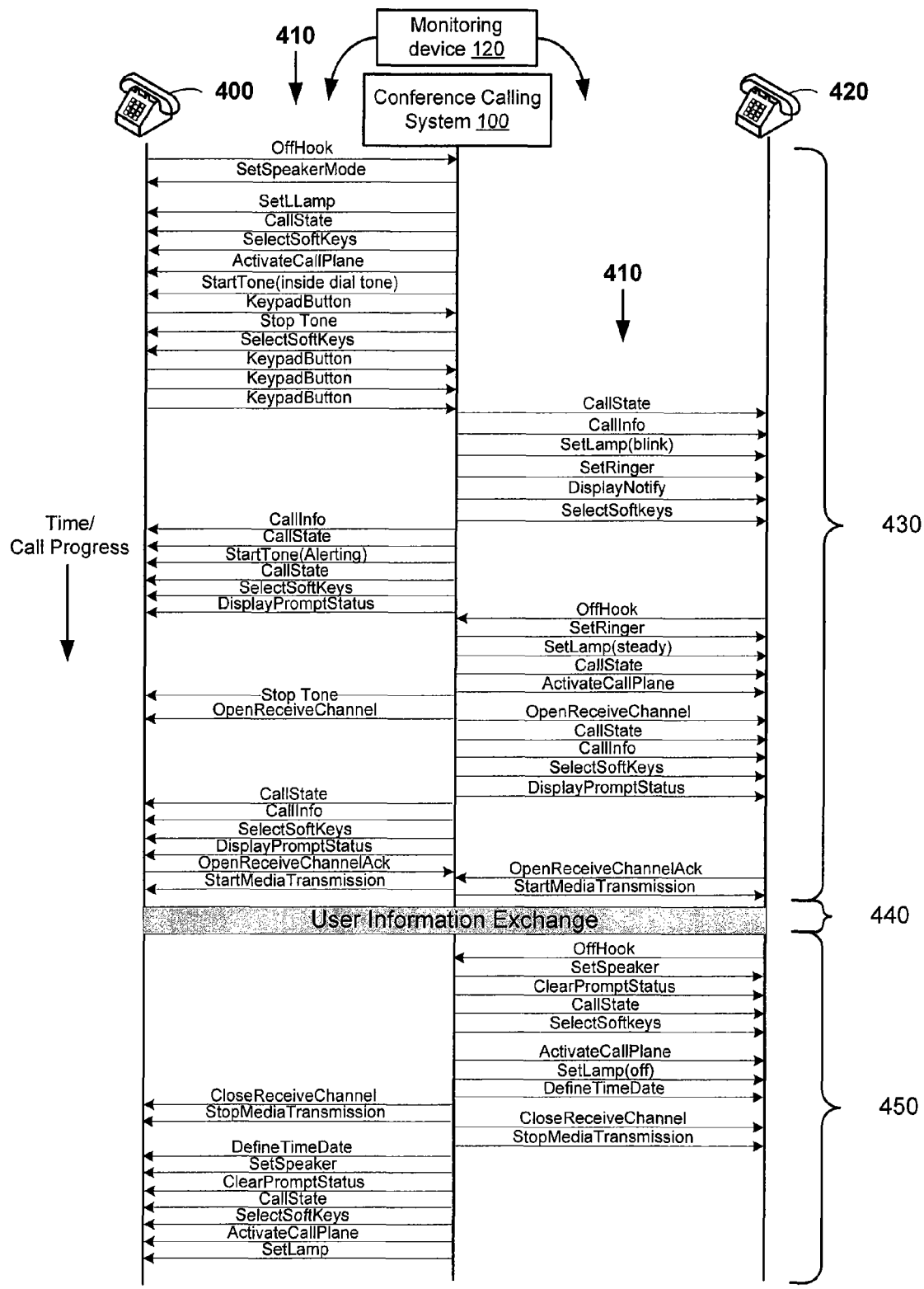
FIG. 4 is a diagram of control protocol communication between devices in an embodiment of the invention.

FIG. 4 is an illustration of the exchange of Skinny messages 410, which is a typical conference calling control protocol, between a multipoint control unit 100 and two VoIP phones 400 and 420. In this embodiment, the monitoring device is monitoring the information exchanged between the multipoint control unit 100 and the VoIP phones 400 and 420 via a network (not shown). In this example, VoIP Phone 400 is initiating a conferencing call session and VoIP phone 420 is being added to a conference calling session. The vertical axis represents time or the progress of the call and the horizontal axis illustrates the multipoint control unit 100, the monitoring device 120, and the VoIP phones 400 and 420. The arrows in the figure represent the exchange of the Skinny messages 410 and the direction that Skinny messages 410 are being passed between the components during the voice conferencing session. All Skinny messages 410 are either received by the multipoint control unit 100 or sent from the multipoint control unit 100. The direction and order of the Skinny messages 410 could vary significantly from this example depending upon user inputs and the number of phones involved in the conference calling session.

The user information exchange 440 is the voice communication that occurs between the users engaging in the conference call (e.g., using RTP packets) after the call has been set up. The Skinny messages 410 exchanged between the phones 400 and 420 before the user information exchange 440 are conference call setup Skinny messages 430. Skinny messages 410 that are transmitted between phones 400 and 420 and the multipoint control unit 100 to terminate the conference call after the user information exchange 430 are the conference call termination Skinny message 450. Both the call setup 430 and call termination 450 occur in a matter of seconds.

In this example, multiple Skinny messages 410 are sent by the VoIP phones 400 and 420 to the multipoint control unit 100 such as OffHook and OpenReceiveChannelAck. The multipoint control unit 100 also sends multiple Skinny messages 410 such as CallInfo and CallState to the VoIP phones 400 and 420. As was mentioned earlier, typical control protocol messages exchanged during a conference calling session contain specific status and attribute information. An example of the type as well as the format of the information combined within the OpenReceiveChannelAck Skinny message, which is a typical Skinny message 410, is shown below:

```
OpenReceiveChannelAck {
    StationMessageID messageID;
    OpenReceiveChanStatus orcStatus;
    UINT32 ipAddr;
    UNIT32 portNumber;
    UINT32 passThruPartyID;
    UNIT32 callReference;
};
```

This OpenReceiveChannelAck Skinny message is sent by the VoIP phones 400 and 420 before the user information exchange 440. The OpenReceiveChannelAck message contains attribute information such as UNINT32 ipAddr, which is an unsigned 32-bit integer IP address of the calling party, and UNINT32 portNumber, which is an unsigned 32-bit integer IP port number of the RTP stream transmitter. For a particular user, the IP port number may not be selected for display, but the IP address may be a parameter selected for real-time display because it identifies the calling party. An example of the contents of a captured OpenReceiveChannelAck packet with specific IP address information is shown below:

Data length: 28
Reserved: 0x0000000
Message ID: OpenReceiveChannelAck (0x00000022)
OpenReceiveChannelStatus: orcok (0)
IP Address: 10.10.202.84 (10.10.202.84)
Port Number: 16284
PassThruPartyID: 33556019

The monitoring device 120 can be configured/programmed to filter the Skinny messages 410 for the OpenReceiveChannelAck and extract the attribute of the IP address 10.10.202.84 from the OpenReceiveChannelAck when it is exchanged by either of the VoIP phones 400 and 420. Similarly, the monitoring device 120 can be further configured/programmed to filter for other Skinny messages 410, in addition to the OpenReceiveChannelAck Skinny message, that contain status and attribute information selected for display to a user. The filtering can be accomplished based on a policy implemented in the monitoring device 120 as, for example, a set of threshold conditions and/or a reference table.

Figure 5:
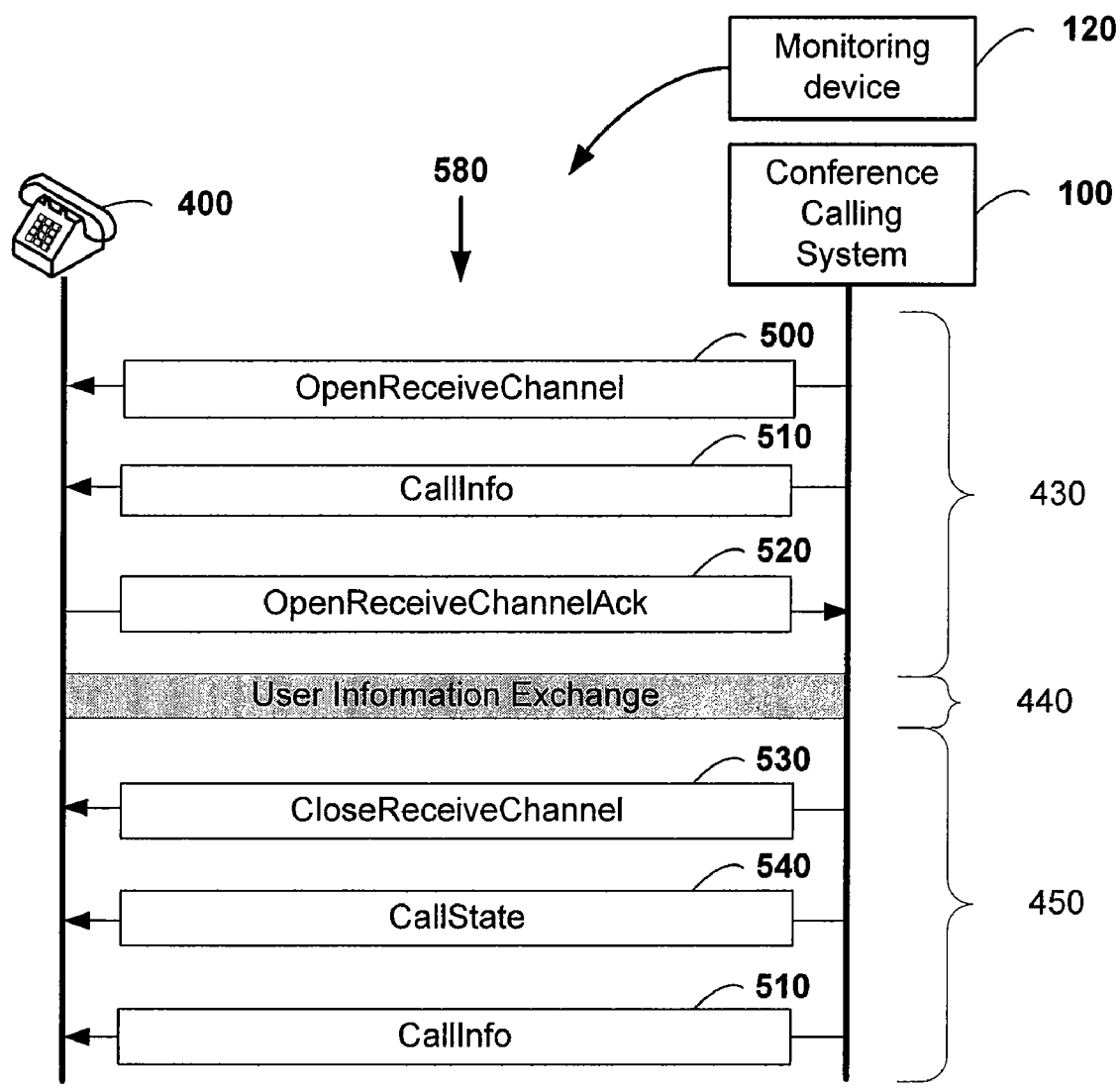
FIG. 5 is a diagram of selected control protocol communication between devices in an embodiment of the invention.

FIG. 5 illustrates a selected set of Skinny messages 580 extracted by the monitoring device 120 (e.g., from a network) as derived from the conference calling session Skinny message 410 exchange illustrated in FIG. 4. During voice conference monitoring, the monitoring device 120 listens to the full set of Skinny messages 410 exchanged between devices in FIG. 4 for the selected Skinny messages 580 in FIG. 5. FIG. 5 only shows the Skinny messages extracted from the exchange between the initiating phone 400 and the multipoint control unit 100. A similar selected set of Skinny messages would also be extracted from the entire set of Skinny messages communicated between the multipoint control unit 100 and VoIP phone 420 during the conference calling session. The Skinny messages selected by the monitoring device 120 in this example include OpenReceiveChannel 500, CallInfo 510, OpenReceiveChannelAck 520, CloseReceiveChannel 530, and CallState 540.

Figure 6:
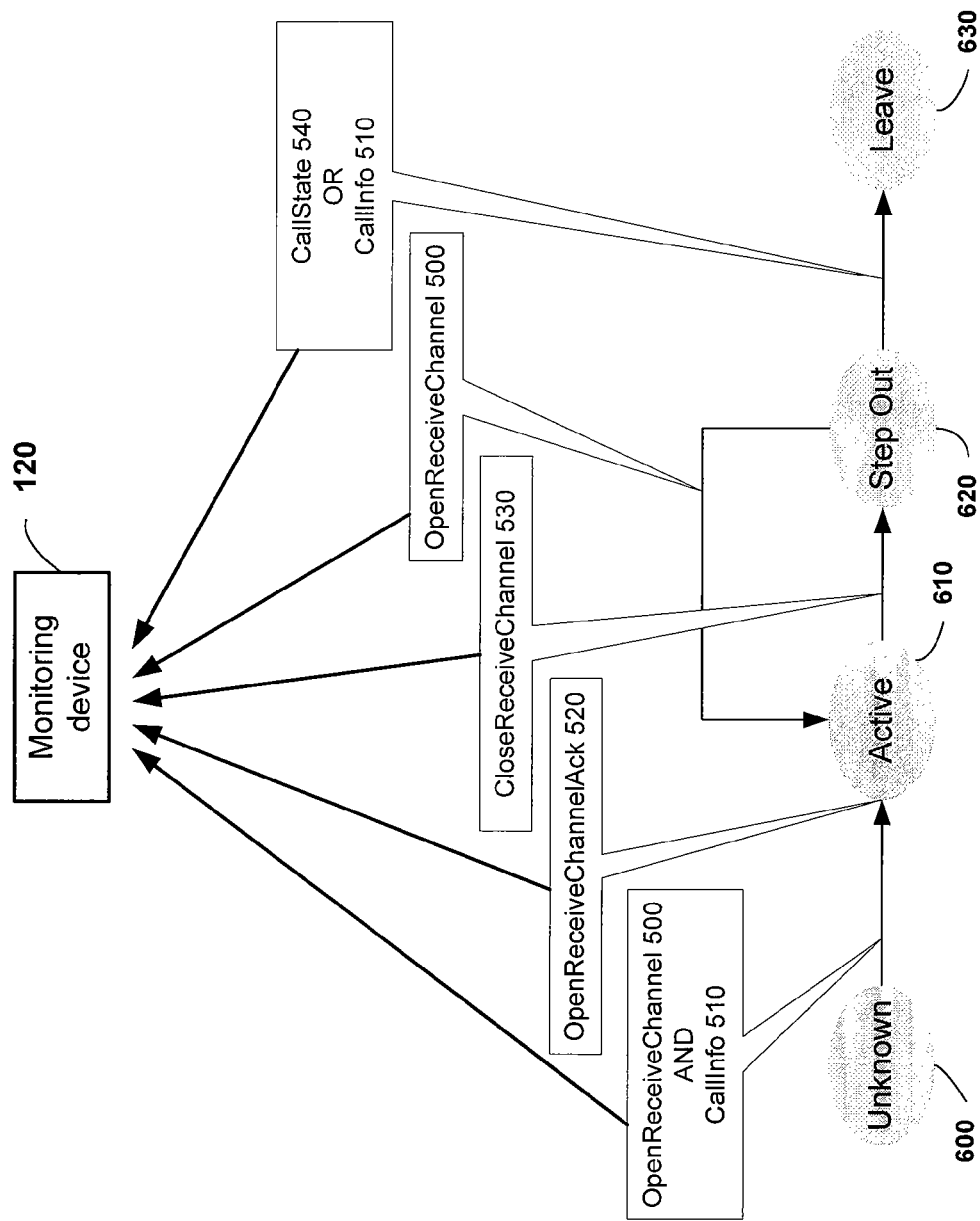
FIG. 6 is a diagram of state transition diagram, according to an embodiment of the invention.

During a typical conference calling session, a connection for a party will move through different states through the exchange of Skinny messages as a party engages and disengages in a conferencing session. FIG. 6 is a diagram that illustrates when the selected Skinny messages 580 from FIG. 5 are exchanged by a VoIP phone or a multipoint control unit and processed by a monitoring device 120 during the transition between states of a single connection in a typical VoIP conference calling session. The states of the VoIP phone are unknown 600, active 610, step-out 620, and leave 630. Although a complete set of Skinny messages, as illustrated in FIG. 4, would be necessary to change the states of a VoIP phone connection in a conference call, the figure illustrates the selected set of Skinny messages processed by a monitoring device 120 for voice conference monitoring.

The first state transition depicted in this figure is the transition of the VoIP phone connection in the conference call from unknown 600 to active 610. The attributes and status of the conferencing party are unknown 600 when first initiating the connection to the multipoint voice conferencing session. The multipoint control unit sends the OpenReceiveChannel 500 and the CallInfo 510 Skinny messages as the VoIP phone is initiating the connection to the conference. These two messages must both be sent during the initial stages of the call, but the order of these messages is interchangeable. The Skinny protocol message CallInfo 510 can be further processed by the monitoring device for information that would allow association of the new connection of the VoIP phone with quality of service information (e.g., received and/or calculated by the monitoring device) based on an RTP media stream of the VoIP phone.

In response to the initial messages from the monitoring device, the phone from the conferencing party sends an OpenReceiveChannelAck 520 Skinny message. The monitoring device processes information from within the Skinny message that the state of the connecting party in the conference call is active 610. Attributes such as the IP address and port number of the connecting party can also be extracted from the OpenReceiveChannelAck 520 sent by the VoIP phone if the monitoring device 120 is configured to display this information. The status as active 610 as well as the attributes of the VoIP phone can then be displayed to the conferencing parties. An example of the information displayed in real-time for this state transition after processing by the monitoring device 120 is shown below:

10.10.213.82 joined Thursday, Mar. 31, 2005 at 13:39
Call Quality Jitter 4 ms, Delay—16 ms, Loss—0.00.

The next transition depicted in this figure is the change of the state of the conferencing party using the VoIP phone from that of active 610 to step-out 620. When the conferencing party momentarily leaves the conferencing session, the CloseReceiveChannel 530 Skinny message is sent from the multipoint control unit. The monitoring device 120 extracts information from the CloseReceiveChannel 530 that acknowledges that the state of the VoIP phone is step-out 620. The quality of service information for the connection is combined with this status of the party as step-out 620. An example of the information displayed in real-time for this state transition after processing by the monitoring device 120 is shown below:

10.10.213.82 stepped out Thursday, Mar. 31, 2005 at 14:10
Call Quality Jitter 2 ms, Delay 10 ms, Loss 0.00.

When the party using the VoIP phone returns from the step-out 620 state to an active 610 state, the OpenReceiveChannel 500 is sent by the conferencing VoIP phone to the multipoint control unit. In response to the OpenReceiveChannel 500 message from the multipoint control unit, the VoIP phone from the conferencing party sends the OpenReceiveChannelAck 520 Skinny message. The monitoring device 120 processes information from within the Skinny message that the state of the party in the call is once again active 610. Attributes that indicate the internet protocol address and port number of the connecting party can also be extracted from the OpenReceiveChannelAck 520 sent by the VoIP phone. The status as active 610 as well as the attributes of the VoIP phone is displayed to the conferencing parties. An example of the information displayed in real-time after processing by the monitoring device 120 for this state transition is shown below:

10.10.213.82 joined Thursday, Mar. 31, 2005 at 14:13
Call Quality Jitter 4 ms, Delay 8 ms, Loss 0.00003.

The final transition in this figure is that from step-out 620 to leave 630. During this transition, the multipoint control unit sends the CallInfo 510 or the CallState 540 to the VoIP phone. The monitoring device 120 extracts information from the CallInfo 510 or the CallState 540 that acknowledges that the party has disconnected from the call. An example of the information displayed in real-time for this state transition after processing by the monitoring device 120 is shown below:

10.10.213.82 disconnected Thursday, Mar. 31, 2005 at 14:19

The embodiments described above can be used to monitor the status, attributes, and quality of service for one or more parties connecting in a multipoint conference calling session in real-time. The monitoring device used to process the control protocol messages and quality of service information can be configured to display selected information for a user of multipoint conferencing. This monitoring method and apparatus can be used in any configuration where the monitoring device can extract and/or calculate status, attributes, and quality of service information for voice conference monitoring. While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents. While the invention has been particularly shown and described with reference to specific embodiments thereof, it will be understood that various changes in form and details may be made.

What is claimed is:

1. A method, comprising:
    processing, during a multipoint conferencing session, a call control protocol message to extract at least one of a status of a connection from the call control protocol message or an attribute of the connection from the call control protocol message, the call control protocol message being used by a multipoint control unit, the multipoint conferencing session being a voice over internet protocol (VoIP)) multipoint conferencing session;
    processing, during the multipoint conference session using a processor, a quality of service parameter calculated based on a media stream and based on a policy including a set of threshold conditions; and
    associating, during the multipoint conference session, the at least one of the status or the attribute extracted from the call control protocol message with the quality of service parameter.

2. The method of claim 1 further comprising:
    displaying to a conferencing party the at least one of the status or the attribute and the quality of service parameter.

3. The method of claim 2, wherein displaying includes displaying in real-time.

4. The method of claim 1, wherein the multipoint control unit includes an internet protocol multipoint control unit.

5. The method of claim 1, wherein the multipoint control unit includes a multipoint control unit configured to function in at least one of a decentralized calling configuration or a centralized calling configuration.

6. The method of claim 1, wherein the processing the call control protocol message includes selecting control protocol messages that contain the status of a connection or the attribute of the connection.

7. The method of claim 1, wherein the processing the call control protocol message includes retrieving the control protocol message from the multipoint control unit.

8. The method of claim 1, wherein the processing the call control protocol messages includes retrieving the control protocol messages from a terminal connecting to the multipoint control unit.

9. The method of claim 1, wherein the set of threshold conditions includes a delay threshold value.

10. The method of claim 1, wherein the processing the quality of service parameter includes retrieving the quality of service parameter from a network connected with the multipoint control unit.

11. An apparatus comprising:
    an input configured to receive a control protocol message used by a multipoint control unit to establish a multipoint conferencing session;
    a processor configured to calculate a quality of service parameter based on a media stream used during the multipoint conferencing session, the processor further configured to associate the control protocol message and the quality of service parameter to obtain a quality of service, a status, and an attribute of the multipoint conferencing session; and
    a display configured to display the status, the attribute, and the quality of service parameter for the multipoint conferencing session to a user in real-time.

12. The apparatus of claim 11, further comprising:
    an output configured to send the status, the attribute, and the quality of service parameter for the multipoint conferencing session to the display in real-time.

13. A method, comprising:
    processing during a multipoint conferencing session a SKINNY call control protocol message to extract, from the SKINNY call control protocol message, at least one of a status associated with the multipoint conferencing session or an attribute associated with the multipoint conferencing session, the multipoint conferencing session being a voice over internet protocol (VoIP) multipoint conferencing session;
    processing, using a processor, a quality of service parameter value associated with a media stream connection established by the multipoint control unit during the multipoint conferencing session based on a policy that defines when the media stream connection is monitored for quality of service; and
    associating, during the multipoint conferencing session, the at least one of the status or the attribute extracted from the SKINNY call control protocol message with the quality of service parameter value.

14. The method of claim 13, wherein at least one of the processing during the multipoint conferencing session the SKINNY call control protocol message is triggered by a change in a state of the multipoint conference session.

15. The method of claim 13, wherein the processing the quality of service parameter value is triggered by a change in a state of the multipoint conference session.

16. The method of claim 13, further comprising sending for display the at least one of the status or the attribute and the quality of service parameter in response to a change in a state of the multipoint conference session.

17. The method of claim 13, further comprising:
    filtering SKINNY messages for defined status and attribute information selected for display.

* * * * *

UNITED STATES PATENT AND TRADEMARK OFFICE
CERTIFICATE OF CORRECTION

PATENT NO.        : 8,218,458 B2                                               Page 1 of 1
APPLICATION NO.   : 11/565181
DATED             : July 10, 2012
INVENTOR(S)       : Flynn et al.

It is certified that error appears in the above-identified patent and that said Letters Patent is hereby corrected as shown below:

In column 9, line 35, in Claim 1, after "(VoIP)", delete ")", therefor

Signed and Sealed this
Eleventh Day of September, 2012

David J. Kappos
*Director of the United States Patent and Trademark Office*